United States Patent [19]

Houlberg et al.

[11] 4,324,010

[45] Apr. 13, 1982

[54] DRIVE UNIT FOR ADJUSTABLE BEDS

[75] Inventors: Don M. Houlberg, Port Washington; Larry D. Anderson, Wisconsin Rapids; Frank M. Damico, Hull, all of Wis.

[73] Assignee: Joerns Furniture Company, Stevens Point, Wis.

[21] Appl. No.: 147,217

[22] Filed: May 6, 1980

[51] Int. Cl.[3] .......... A61G 7/00; F16H 5/00

[52] U.S. Cl. .......... 5/68; 5/63; 74/324; 74/404; 192/81 C; 192/84 T

[58] Field of Search .......... 5/60, 62-69; 74/324, 404, 337; 192/81 C, 84 T

[56] References Cited

U.S. PATENT DOCUMENTS

| | | | |
|---|---|---|---|
| 830,261 | 9/1906 | Sterling | 5/63 |
| 2,522,759 | 9/1950 | Lindquist | 5/63 |
| 2,568,808 | 9/1951 | Johanson . | |
| 2,632,336 | 3/1953 | Luketa | 74/472 |
| 2,660,899 | 12/1953 | McCammon | 74/337 |
| 3,026,939 | 3/1962 | Hungerford et al. | 74/368 |
| 3,216,392 | 11/1965 | Shimanckas . | |
| 3,281,872 | 11/1966 | Dewey | 5/63 |
| 3,281,873 | 11/1966 | Stanley et al. | 5/68 |
| 3,414,913 | 12/1968 | Stanley et al. | 5/68 |
| 3,676,881 | 7/1972 | Duprey | 5/63 |
| 3,739,406 | 6/1973 | Koetter | 5/68 |
| 3,798,684 | 3/1974 | Benoit et al. | 5/66 |
| 3,919,727 | 11/1975 | Paine | 5/63 |
| 3,934,690 | 1/1976 | Janning | 192/84 T |
| 3,974,902 | 8/1976 | Wahlstedt et al. | 192/84 T |
| 4,038,709 | 8/1977 | Kerwit | 5/66 X |
| 4,062,074 | 12/1977 | Holland | 5/66 X |
| 4,094,024 | 6/1978 | Benoit et al. | 5/66 |

*Primary Examiner*—Stephen J. Novosad
*Attorney, Agent, or Firm*—Price, Heneveld, Huizenga & Cooper

[57] ABSTRACT

A drive unit for adjustable beds, such as hospital beds and the like, of the type which have movable head and foot sections, and/or other adjustment functions, comprises a single, unidirectional, rotary motor, and a drive shaft for each adjustable bed function. A pair of drive wheels are rotatably mounted on each of the drive shafts, and are rotated thereon in opposite directions by the motor. A pair of spring clutches are operably associated with each pair of drive wheels, and alternatively engage or connect selected drive wheels with their associated shafts to rotate the shafts, and thereby adjust the position and/or configuration of the bed.

22 Claims, 4 Drawing Figures

DRIVE UNIT FOR ADJUSTABLE BEDS

CROSS REFERENCE TO RELATED APPLICATIONS

The disclosed embodiment of the present invention includes a solenoid activated spring clutch which is described and claimed in copending U.S. patent application Ser. No. 147,139, filed May 6, 1981, entitled SOLENOID ACTIVATED SPRING CLUTCH, which is hereby incorporated by reference.

BACKGROUND OF THE INVENTION

The present invention relates to drive mechanisms, and in particular to a drive unit for adjustable, hospital-type beds.

Adjustable beds, such as those described in U.S. Pat. Nos. 3,919,727; 3,414,913; 3,281,872; and 3,281,873, which are hereby incorporated by reference herein, are used in hospitals, nursing homes, and other similar institutions, particularly for the care of non-ambulatory patients. Such adjustable beds usually have three basic movements of functions, including a pivoting head section, a pivoting leg section, and a vertically adjustable mattress support to vary the elevation of the patient to a selected height. The bed sections are adjustable to provide patient comfort, as well as a wide range of therapeutic positions. In some beds, an adjustable center section and/or tilt provides a fourth function to achieve an even wider range of bed configurations.

Heretofore, each adjustable bed section or function was typically powered by a separate gearmotor. Since gearmotors are relatively expensive, and have comparatively little actual running time during the effective life of the bed, such designs are quite expensive, and economically inefficient.

SUMMARY OF THE INVENTION

The present invention provides a drive unit for an adjustable bed of the type having at least one movable support portion. The drive unit comprises a unidirectional, rotary drive motor, and a drive shaft operably connected with the movable bed portion for manipulating the same. First and second drive wheels are rotatably mounted on the drive shaft, and means are provided for operably connecting both of the drive wheels with the motor to rotate the same in opposite directions on the drive shaft. First and second clutches alternatively connect the drive wheels with the drive shaft for rotation therewith, whereby the first clutch is engaged with the drive shaft and the second clutch is disengaged therefrom to move the bed portion in one direction, and the reverse clutch engagement moves the bed portion in the other direction.

In another aspect of the present invention, each movable section of a multi-function adjustable bed has a drive shaft connected therewith, with a pair of clutched gears rotatably mounted on each shaft. A single, unidirectional, rotary motor rotates each pair of gears in opposite directions on the associated shafts, such that any desired combination of bed movements may be simultaneously achieved by engaging the proper clutches. The clutches are preferably solenoid activated wrap-down spring clutches, which have both quick response and secure clutch engagement.

The principal objects of the present invention are: to provide a drive for adjustable beds comprising a single, unidirectional drive motor for efficient operation and reduced manufacturing cost; to provide an adjustable bed drive capable of fully powering a multi-function adjustable bed; to provide an adjustable bed drive having a plurality of clutches which engage the motor with one or more selected bed functions; to provide an adjustable bed drive having clutches which are independently actuated for quickly moving more than one bed function at a time; to provide an adjustable bed drive having solenoid activated spring clutches for quick response and secure engagement; to provide an adjustable bed drive, wherein each bed function has a separate drive shaft on which a pair of clutched drive wheels are rotated in opposite directions for economically adjusting each section of a multi-function bed with a single, unidirectional motor; and to provide an adjustable bed drive which is efficient in use, capable of a long operating life, and particularly well adapted for the proposed use.

These and many other important advantages, features and objects of the present invention will be further understood and appreciated by those skilled in the art by reference to the following written specification, claims and appended drawings.

DETAILED DESCRIPTION OF THE PREFERRED EMBODIMENTS

Figure 1:
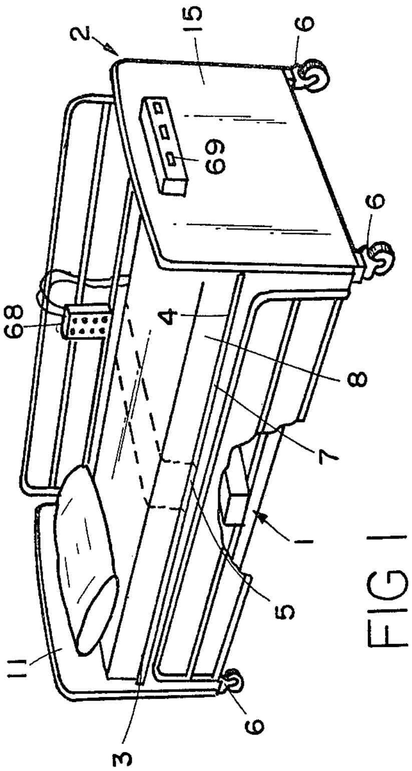
FIG. 1 is a perspective view of a drive unit embodying the present invention, shown mounted in an adjustable hospital-type bed, with portions thereof broken away.

For purposes of description herein, the terms "upper", "lower", "right", "left", "rear", "front", "vertical", "horizontal", and derivatives thereof shall relate to the invention as oriented in FIG. 1. However, it is it be understood that the invention may assume various alternative orientations, except where expressly specified to the contrary.

The reference number 1 (FIG. 1) generally designates a drive unit for adjustable beds, such as those generally known in the trade as "hospital beds". The illustrated bed 2 includes a pivoting head section 3, a pivoting foot section 4, a center section 5, and telescoping legs 6 which can be extended and retracted to vary the elevation and inclination of the bed frame 7 and mattress 8. Bed 2 is mechanically somewhat similar to the devices disclosed in U.S. Pat. Nos. 3,919,727 and 3,281,873, which have been incorporated by reference herein, and includes conventional articulated joints and tilting arms.

Figure 2:
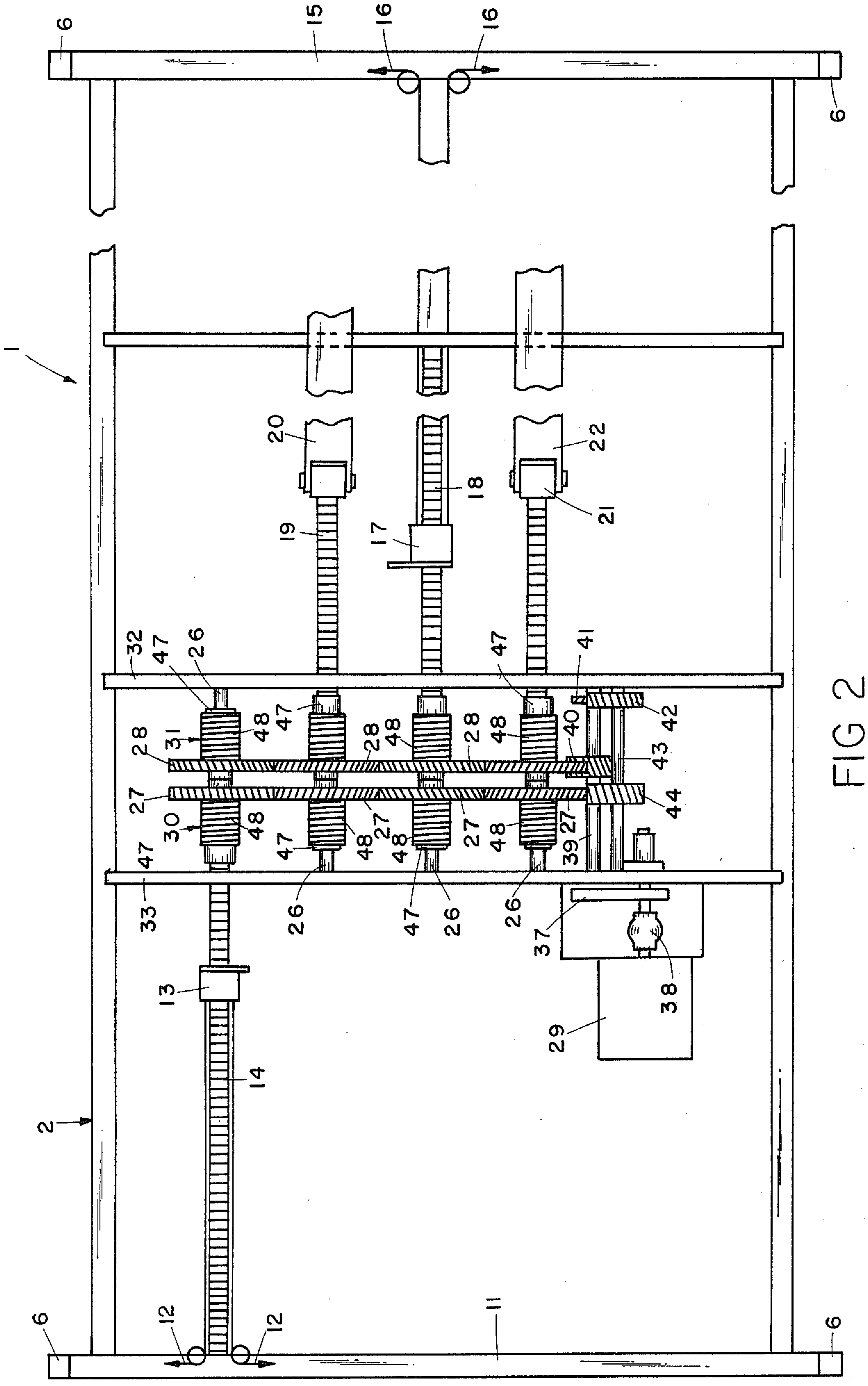
FIG. 2 is a fragmentary, partially schematic, top plan view of the adjustable bed drive.

As schematically shown in FIG. 2, the telescoping legs 6 at the head end 11 of the bed are extended and retracted by a pair of cables 12, having the ends thereof attached to a threaded collar 13 which reciprocates on a screw 14 in response to shaft rotation. In a similar manner, the telescoping feet 6 at the foot end 15 of the bed are vertically adjusted by cables 16, which are in turn connected with a threaded collar 17 mounted on a threaded shaft 18. The legs at the head and foot of the bed can be independently extended and retracted to vary the tilt or inclination of the frame 7. Most adjustable beds require that the bed be manipulated to either a fully raised or fully lowered position before the bed can be inclined into a Trendelenburg position. In contradistinction, the bed of the present device can be adjusted immediately to any Trendelenburg position, including reverse Trendelenburg, from any bed configuration or position, thereby eliminating unnecessary motion and reducing the adjustment time. A third threaded collar and screw arrangement 19 is provided with a pivotally mounted tilt arm 20 which is connected with the head section 3 of the bed, and pivots the same in response to reciprocal movement of the collar. In a similar fashion, another collar and screw assembly 21 is connected with the foot section 4 of the bed by a lever arm 22, and pivots the same in response to movement of the collar.

The threaded shafts or screws 14, 18, 19 and 21 are selectively rotated by separate drive shafts 26. The illustrated drive shafts 26 are rotatably supported between a pair of laterally extending braces 32 and 33, and are oriented substantially parallel with the longitudinal axis of the bed. A pair of drive wheels 27 and 28 is rotatably mounted on each of the drive shafts 26, with the wheels rotated thereon in opposite directions by a motor 29. A pair of clutches 30 and 31 is operably associated with each pair of drive wheels 27 and 28, and alternatively engage or connect selected drive wheels with their associated shaft to rotate the same therewith and thereby adjust the bed functions.

The drive wheels 27 and 28 (FIG. 2) comprise gears which are mounted on the drive shafts 26 for free rotation thereon in the disengaged position. Each pair of gears 27 and 28 is disposed in an opposed, mutually parallel relationship adjacent the center of the drive shaft. The gear pairs 27 and 28 are aligned in two, parallel rows, on the left and right hand side of the drive unit (as viewed in FIG. 2), with laterally adjacent gears meshing or entrained to transmit rotary motion therebetween. The illustrated gears 27 and 28 have inclined teeth which tend to retain the gears in alignment during operation.

Motor 29 is a unidirectional, rotary motor, which is connected with a speed reducer 37 by a flexible coupling 38. Motor 29 is preferably electric so as to provide a source of power which can be intermittently activated. Speed reducer 37 drives an input shaft 39 which is rotatably mounted between lateral braces 32 and 33, and is oriented substantially parallel with drive shafts 26. A pair of spaced apart gears 40 and 41 are connected with input shaft 39 and rotate therewith. Gear 40 is located at a medial portion of the shaft, and meshes with the right hand gear 28 of the foot function 22, so as to impart rotation to each of the gears in the right hand row as viewed in FIG. 2. Gear 41 meshes with a mating gear 42 attached to and rotating an idler shaft 43, which is also pivotally mounted between lateral braces 32 and 33. A fourth gear 44 is attached to a reversing or idler shaft 43, and meshes with the gears 27 in the left hand row as viewed in FIG. 2, thereby imparting rotary motion to each of the gears 27. The idler gear arrangement rotates the gears in such a manner that the gears 27 and 28 in each pair rotate in opposite directions.

Each pair of clutch units 30 and 31 includes a pair of clutch drums 47, which are connected with the associated drive shaft 26 for rotation therewith. The gears 27 and 28 each include a hub portion (not shown) which mates with an adjacent clutch drum 47 and forms a cylindrical surface over which a wrap-down spring 48 is concentrically positioned. The wrap-down spring 48 has one end thereof connected with the associated drive gear, and has a normally disengaged position, where a gap is formed between the inside surface of spring 48 and the outside surface of clutch drum 47, such that the spring may rotate about the clutch drum without excessive drag or friction. The clutch drums 47 and springs 48 are preferably ferromagnetic, for purposes to be described in greater detail hereinafter.

Figure 4:
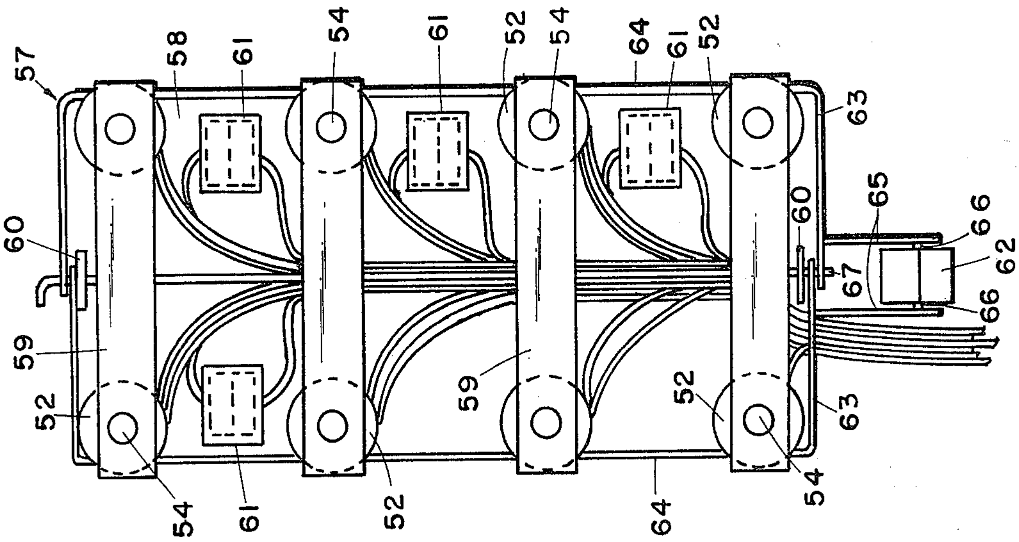
FIG. 4 is a plan view of a solenoid housing for the adjustable bed drive.
Figure 3:
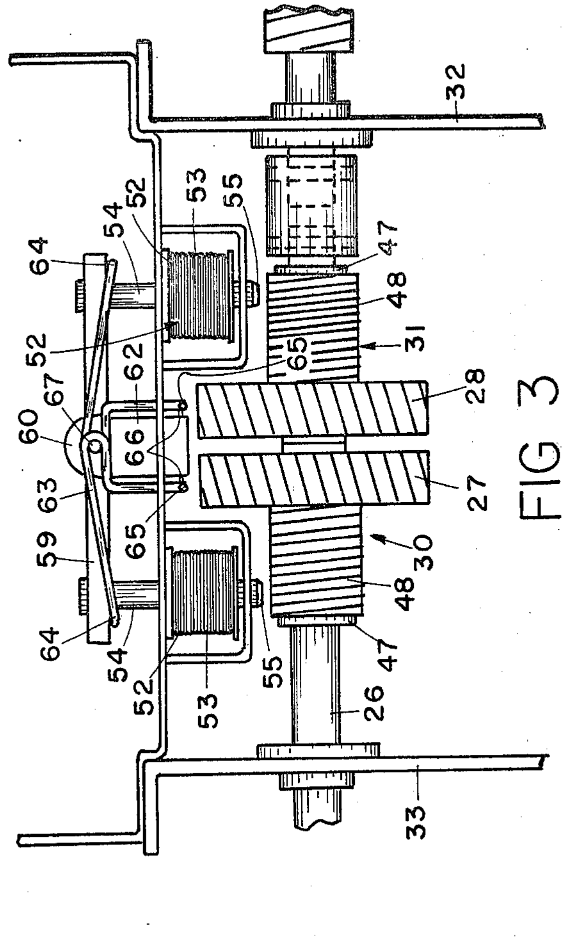
FIG. 3 is an elevational view of a clutch portion of the adjustable bed drive.

The drive unit 1 includes means for initiating the wrap-down of the clutch springs 48 to place the clutches in an engaged condition. The clutch activating means may comprise an arm or lever which abuts the free end of the spring 48 and urges the same against the brake drum, or similar such devices. A preferred arrangement is illustrated in FIGS. 3 and 4, wherein each of the spring clutches 30 and 31 is activated or manipulated by a solenoid 52, which includes a toroidal coil 53 with a ferromagnetic plunger 54 slideably mounted in the center of the coil. The solenoid plungers 54 are each radially oriented with respect to the associated clutch drum 47 and spring 48, and include a free end 55 which extends and retracts in response to energizing the coil 53. Energizing one of the coils 53 extends the free end of the associated plunger 54 abuttingly against the associated spring 48, and urges the spring into frictional engagement with the clutch drum 47. The activation of the coil simultaneously magnetizes the plunger 54, thereby creating a magnetic attraction between the plunger and the clutch drum to provide a dual wrap-down pressure for effective clutch engagement. Hence, the solenoid activated spring clutches are capable of transmitting relatively high loads with low coil power, such that separate electrical relays are not required. This arrangement provides a design with improved safety for both the patient and the attending staff.

As best illustrated in FIG. 4, each pair of clutches 30 and 31 is provided with a pair of associated solenoids 52, such that in the illustrated arrangement, there are eight solenoids which are mounted in a housing 57 which overlies the drive units and orients the plungers in a radial direction with respect to the clutch springs. Housing 57 includes a plate 58 to which each of the solenoids 52 is fixedly attached. Each pair of soleniods 52 is preferably interconnected so as to prevent both of the associated clutches from being energized at the same time, which would cause the drive unit to lock up and stall the motor. In this example, the upper ends of each pair of solenoid plungers 54 are interconnected by a rocker arm 59 which is pivotally mounted at a medial portion thereof by a bracket 60. When one of the solenoids is activated, thereby extending the associated plunger, the plunger of the other solenoid is further retracted. This see-saw action of the rocker arm 59 prevents both of the spring clutches from being engaged at the same time.

Limit switches 61 (FIG. 4) are preferably connected with the solenoids 52 to restrict movement of the various bed functions between predetermined safety limits. The vertical leg adjustment, as well as the head and foot sections, each have limits beyond which the same should not be manipulated. Each such bed function includes a position or attitude sensor (not shown) which is mounted thereto, and is in turn wired with one of the limit switches 61 in a manner which deactivates the associated clutch solenoid when the bed section has reached its outer limit. Preferably, the limit switches 61 are wired to deactivate only the clutch for the particular bed function which has assumed one of the predetermined, extreme positions, such that the other bed sections can continue to be adjusted.

The embodiment illustrated in FIG. 3 also includes a switch 62 which is connected with the drive motor 29, and automatically turns the motor on and off in response to the activation of the solenoid coils 53. Formed wire members 63 are pivotally mounted on bracket 60, and include one end 64 disposed below the outer end of the rocker arm 59, and the other end 65 positioned abutting against a contactor portion 66 of switch 62. When one of the solenoids is activated, the associated plunger is extended, thereby rotating the formed wire arm 63 and depressing the associated switch contactor 66, so as to close the switch and automatically turn the motor on. When the coil is deenergized, the plunger is retracted to its normal position, switch contactor 66 is released, and the switch is opened to deactivate the motor. In the structure illustrated in FIG. 4, separate wire members 63 are pivotally mounted on a pin 67 to interconnect the rocker arm motion on the left and right hand sides of the housing 58, such that the activation of any one of the solenoids on one side of the housing pivots the wire end 65 and depresses the associated switch contactor.

In use, the drive unit 1 is mounted in an adjustable bed 2 in a suitable manner, such as that schematically illustrated in FIG. 2. The solenoids 52 are preferably connected with both a pendant hand controller 68 and a stationary or staff controller 69, so that the bed functions may be easily operated by either the patient or an attendant. The controllers preferably include an electrical circuit (not shown) for simultaneously activating two of the solenoids by manipulating a single switch for purposes such as quickly adjusting the bed into either a Trendelenberg position or a reverse Trendelenberg position. When any one of the solenoids 52 is activated, motor 29 is energized, and imparts rotation to each pair of gears 27 and 28. If a clutch is in the disengaged position, the associated gear will rotate freely on drive shaft 26. On the other hand, if the clutch is in the engaged position, with the plunger free end abutting the clutch spring and urging the same frictionally against the associated clutch drum, rotation of the gear and spring will cause the spring 49 to wrap constrictingly down upon the gear hub and clutch drum 47 so as to transmit rotation therebetween. Since the gears in each pair are rotating in opposite directions, the engagement of one of the clutches in a given pair moves the associated adjustable bed function in one direction, and engagement of the other clutch in the pair moves the adjustable bed function in the opposite direction. When the motor is energized, all of the gears 27 and 28 are continuously rotated. Any desired combination of bed movements, such as head up, foot down, elevation up or tilt down may be achieved simultaneously by simply engaging the proper clutches. The direction of motion of a bed section may be immediately reversed by deactivating the energized clutch, and activating the other clutch of the clutch pair. Since the bed sections are driven by a clutch arrangement, the motion of the bed functions can be reversed "midstream" or while running, without damaging the drive unit. Rocker arm 59 prevents both clutches in the pair from being energized at the same time. Hence, if the patient and the attendant simultaneously depress switches on the hand and master controllers 68 and 69 respectively, which attempt to activate the same bed function in opposite directions, both of the clutches will not engage.

The clutches 30 and 31 are disengaged by deenergizing the associated solenoid 52, which in turn retracts the plunger 54, such that the frictional force between the spring and clutch drum is not sufficient to maintain frictional engagement, thereby allowing the spring to automatically expand to the disengaged position. When none of the solenoids 52 is activated, switch 62 assumes an open position, wherein motor 29 is turned off.

In the above described drive unit arrangement, one clutch of each of the four pairs may be simultaneously engaged so as to move each of the bed functions at the same time. Since the drive gears are arranged in pairs, wherein the gears are driven in opposite directions, all of the bed functions may be fully powered by a single, unidirectional drive motor to achieve efficient operation at reduced manufacturing cost. The solenoid activated spring clutches provide a quick response with secure, reliable engagement.

In the foregoing description, it will be readily appreciated by those skilled in the art that many modifications may be made to the invention without departing from the concepts disclosed herein. Such modifications are to be considered as included in the following claims unless these claims by their language expressly state otherwise.

The embodiments of the invention in which an exclusive property or privilege is claimed are defined as follows:

1. In an adjustable bed having at least one movable support portion, the improvement comprising:

a unidirectional rotary drive motor;

a rotatable drive shaft operably connected with said movable bed portion and adapted for moving the same in a first direction when rotated in one direction, and in the opposite direction when said shaft is rotated in the opposite direction;

first and second drive wheels rotatably mounted on said drive shaft;

means for operably connecting each of said drive wheels with said motor and rotating the same in opposite directions on said drive shaft;

first and second clutches alternatively connecting said drive wheels with said drive shaft for rotation therewith, whereby said first clutch is engaged with said drive shaft and said second clutch is disengaged therefrom to move said bed portion in the one direction, and said first clutch is disengaged from said drive shaft and said second clutch is engaged therewith to move said bed portion in the opposite direction.

2. A bed as set forth in claim 1, wherein:

said clutches are wrap-down spring clutches.

3. A bed as set forth in claim 2, wherein:

said spring clutches each include a solenoid activating the same.

4. A bed as set forth in claim 1, wherein:

said drive wheel rotating means includes an idler shaft and an idler wheel for imparting opposite rotative motion to said drive wheels.

5. In a hospital bed with adjustable functions, including a pivoting head section, a pivoting foot section, and means for varying the elevation of the bed, the improvement comprising:

a unidirectional, rotary drive motor;

first, second and third drive shafts respectively connected with said head section, said foot section, and said elevation means, and manipulating the same;

a pair of drive wheels rotatably mounted on each of said shafts;

means for operably connecting each of said drive wheels with said motor, and rotating the wheels of each pair in opposite directions on the associated drive shaft;

a pair of clutches operably associated with each pair of drive wheels and alternatively connecting the drive wheels with the associated drive shaft, whereby one of each pair of clutches is engaged to adjust the associated bed function in one direction, and the other of each pair of clutches is engaged to adjust the associated bed function in the other direction.

6. A bed as set forth in claim 5, wherein:

said drive wheels comprise gears in which the pairs are aligned in two, parallel rows, with laterally adjacent gears meshing to transmit rotary motion therebetween.

7. A bed as set forth in claim 6, wherein:

said drive wheel connecting means includes a gear meshing with one of said gears in one of said rows to rotate all of the gears in said one row; and including an idler shaft with first and second gears rotating therewith; said first gear meshing with a gear of one pair, and said second gear meshing with the other gear of said pair for rotating all of the gears in the other row.

8. A bed as set forth in claim 7, wherein:

said clutches are wrap-down spring clutches with springs connected with said gears and rotating therewith; and said clutches include clutch drums disposed concentrically within said springs and connected with the associated drive shaft for rotation therewith, whereby spring wrap-down interconnects the associated gear and drum for transmitting rotation therebetween.

9. A bed as set forth in claim 8, wherein:

said spring clutches each include a solenoid for activating the same.

10. A bed as set forth in claim 9, wherein:

each solenoid has a coil, and a ferromagnetic plunger with a free end which extends and retracts in response to energizing the associated coil; and said clutch drums are ferromagnetic, whereby energizing one of said coils extends the associated plunger free end abuttingly against the associated spring and urges the associated spring into frictional engagement with the associated drum, and simultaneously magnetizes the associated plunger, thereby creating a magnetic attraction between the associated plunger and the associated drum, which further urges the associated plunger against said associated spring and said drum to provide a dual wrap-down pressure for effective clutch engagement.

11. A clutch as set forth in claim 10, wherein:

said springs are ferromagnetic.

12. A drive unit for hospital beds having adjustable bed functions, including pivoting head and foot sections, and means for varying the elevation of the bed, said drive unit comprising:

a unidirectional, rotary drive motor;

first, second and third drive shafts adapted for connection with said head section, said foot section, and said elevation means respectively, and for manipulating the same;

a pair of drive wheels rotatably mounted on each of said shafts;

means for operably connecting each of said drive wheels with said motor, and rotating the wheels of each pair in opposite directions on the associated drive shaft;

a pair of clutches operably associated with each pair of drive wheels and alternatively connecting the drive wheels with the associated drive shaft, whereby one of each pair of clutches is engaged for adjusting the associated bed function in one direction, and the other of each clutch pair is engaged for adjusting the associated bed in the other direction.

13. A drive unit as set forth in claim 12, wherein:

said clutches are solenoid activated spring clutches.

14. In an adjustable bed, the improvement comprising:

a frame having independently vertically adjustable supports at head and foot ends of said frame for raising and lowering the same; first means for extending and retracting said head support;

second means for extending and retracting said foot support independently of said head support extending and retracting means, whereby said bed can be adjusted to a Trendelenburg position from any bed position; and means for simultaneously moving said head and foot supports in either the same or opposite directions;

said first and second means comprising a rotary drive motor; first and second drive shafts operably connected with said head support and said foot support respectively; a drive wheel rotatably mounted on each of said drive shafts; means for operably connecting each drive wheel with said motor and rotating the same; and a clutch operably associated with each drive wheel and connecting the same with the associated drive shaft for selectively and independently manipulating said head and foot frame supports.

15. In an adjustable bed, the improvement comprising:

a frame having independently vertically adjustable supports at head and foot ends of said frame for raising and lowering the same;

first means for extending and retracting said head support;

second means for extending and retracting said foot support independently of said head support extending and retracting means, whereby said bed can be adjusted to a Trendelenburg position from any bed position; and means for simultaneously moving said head and foot supports in either the same or opposite directions;

a unidirectional, rotary drive motor; first and second drive shafts operably connected with said head and foot supports respectively, and adapted for moving the same in a first direction when rotated in one direction, and in the opposite direction when said shaft is rotated in the opposite direction; a pair of drive wheels rotatably mounted on each of said drive shafts; means for operably connecting each of said drive wheels with said motor and rotating the wheels of each pair in opposite directions on the associated drive shaft; and a pair of clutches associated with each pair of drive wheels and alternatively connecting said drive wheels with the associated drive shaft for rotation therewith, whereby one of each pair of clutches is engaged to adjust the associated frame support in one direction, and the other of each pair of clutches is engaged to adjust the associated frame support in the opposite direction.

16. An adjustable bed as set forth in claim 15, wherein:

said clutches each include a soleniod activating the same.

17. In an adjustable bed having at least one movable support portion, the improvement comprising:

a unidirectional rotary drive motor;

a rotatable drive shaft operably connected with said movable bed portion and adapted for moving the same in a first direction when rotated in one direction, and in the opposite direction when said shaft is rotated in the opposite direction;

first and second drive wheels rotatably mounted on said drive shaft;

means for operably connecting each of said drive wheels with said motor and rotating the same in opposite directions on said drive shaft;

first and second clutches alternatively connecting said drive wheels with said drive shaft for rotation therewith, whereby said first clutch is engaged with said drive shaft and said second clutch is disengaged therefrom to move said bed portion in the one direction, and said first clutch is disengaged from said drive shaft and said second clutch is engaged therewith to move said bed portion in the opposite direction; and means for positively retaining one of said clutches in a disengaged position when the other of said clutches is in an engaged position.

18. A bed as set forth in claim 17, wherein:

said clutches are disposed in a side-by-side relationship, and comprise wrap-down spring clutches activated by solenoids with reciprocating plungers; and said retaining means comprises a rocker arm having opposing ends thereof connected with said solenoid plungers, with a medial portion thereof pivotally mounted on said bed, whereby extension of one of said plungers toward the associated spring clutch automatically retracts the other of said plungers.

19. A bed as set forth in claim 18, including:

means for urging and retaining said rocker arm in a horizontal orientation with both solenoid plungers partially retracted when both of said clutches are disengaged.

20. A drive unit for hospital beds having adjustable bed functions, including pivoting head and foot sections, and means for varying the elevation of the bed, said drive unit comprising:

a unidirectional, rotary drive motor;

first, second and third drive shafts adapted for connection with said head section, said foot section, and said elevation means respectively, and for manipulating the same;

a pair of drive wheels rotatably mounted on each of said shafts;

means for operably connecting each of said drive wheels with said motor, and rotating the wheels of each pair in opposite directions on the associated drive shaft;

a pair of clutches operably associated with each pair of drive wheels and alternatively connecting the drive wheels with the associated drive shaft, whereby one of each pair of clutches is engaged for adjusting the associated bed function in one direction, and the other of each clutch pair is engaged for adjusting the associated bed in the other direction; and means for positively retaining one clutch of each pair in a disengaged position when the other clutch of the pair is in an engaged position.

21. A bed as set forth in claim 20, wherein:

said clutches in each pair are disposed in a side-by-side relationship, and comprise wrap-down spring clutches activated by solenoids with reciprocating plungers; and said retaining means comprises first, second and third rocker arms, each having opposing ends thereof connected with the solenoid plungers of an associated clutch pair and with a medial portion thereof pivotally mounted on said bed, whereby extension of one plunger in a clutch pair toward the associated spring clutch automatically retracts the other plunger of the clutch pair.

22. A bed as set forth in claim 21, including:

means for urging and retaining said rocker arms in a horizontal orientation with both solenoid plungers of each pair partially retracted when both clutches of the pair are disengaged.

* * * * *

UNITED STATES PATENT AND TRADEMARK OFFICE

CERTIFICATE OF CORRECTION

PATENT NO. : 4,324,010

DATED : April 13, 1982

INVENTOR(S) : Don M. Houlberg et al

It is certified that error appears in the above—identified patent and that said Letters Patent is hereby corrected as shown below:

Column 2, line 43:
"it is it" should be --it is to--

Column 4, line 44:
"soleniods" (second recitation) should be --solenoids--

Column 9, line 13:
"soleniod" should be --solenoid--

Signed and Sealed this

*Second* Day of *November 1982*

[SEAL]

*Attest:*

GERALD J. MOSSINGHOFF

*Attesting Officer* *Commissioner of Patents and Trademarks*